United States Patent Office 3,578,484
Patented May 11, 1971

3,578,484
SURFACE PREPARATION AND ELECTROSTATIC SPRAY COATING OF PLASTIC ARTICLE
Wilhelm E. Walles and Arnett L. Bird, Midland, Mich., assignors to The Dow Chemical Company, Midland, Mich.
No Drawing. Continuation-in-part of application Ser. No. 732,871, May 29, 1968. This application Feb. 13, 1969, Ser. No. 799,078
Int. Cl. B05b 5/02; B44d 1/092
U.S. Cl. 117—47                                    12 Claims

ABSTRACT OF THE DISCLOSURE

Process for the spray coating of plastic articles wherein the articles are surface sulfonated before they are electrostatic spray coated. The articles can be neutralized after sulfonation if desired. A degree of sulfonation of at least about 0.001 milligram sulfur trioxide or equivalents thereof per square centimeter of plastic surface is required to give the desired uniform coating and good adhesion. The sprayed coatings can be liquid paints or lacquers, powdered plastics and liquid coatings containing filamentary reinforcing agents which are normally cured by drying, heating and drying, or heating.

CROSS REFERENCE

This application is a continuation-in-part of Ser. No. 732,871, filed May 29, 1968, now abandoned.

BACKGROUND OF INVENTION

This invention relates to a method for the electrostatic spray coating of plastic articles.

It is known from U.S. Pat. 2,723,921 that non-conductive materials such as fiberboard can be electrostatically spray coated if they are given a coating of a conducting liquid such as water. It is further known that plastics may be made conductive by impregnation, coating or compounding with inorganic and organic materials such as those taught in U.S. Pats. 2,761,854; 2,817,603; 2,879,-234; 3,003,975; 3,249,559; 3,346,444; and 3,357,930.

It is also known from U.S. Pat. 2,937,066 that polyethylene can be sulfonated to render it dyeable and antistatic.

These prior art techniques have not been practical to render plastics coatable by the electrostatic coating method. In the case of additives, they have to be used in such a large amount that the desired physical properties of the plastic are altered. In the case of conductive coatings or lacquers, they are undesirable since their use requires a separate coating and drying step. They are also undesirable in that the solvents used to put them on may damage or etch the plastic substrate. Furthermore, the coating itself interferes with the physical properties of the final coating such as its adherence. In the case of sulfonation of polyethylene to render it dyeable and antistatic, the degree of sulfonation is so low that the polyethylene cannot be spray coated in an electrostatic coating apparatus.

SUMMARY OF INVENTION

It now has been discovered that sulfonatable plastic articles can be coated by an electrostatic coating process to achieve a uniform coating with superior adherence if they are surface sulfonated to a degree such that they have at least about 0.001 milligram (calculated as $SO_3$) of sulfonic acid groups or neutralized sulfonic acid groups per square centimeter of surface and a surface resistivity of less than $10^{12}$ ohm per square. The preferred degree of sulfonation is in the range from .01 to 1.0 milligram of $SO_3$ in the form of the above sulfonic acid groups per square centimeter of surface.

It has been further found that a degree of sulfonation less than about 0.001 milligram of $SO_3$ per square centimeter of surface will not give the desired uniform coating and good adhesion. On the other hand, a degree of sulfonation greater than about 50.0 milligrams of $SO_3$ in the form of the sulfonic acid groups per square centimeter does not achieve any greater adhesion or uniformity of coating and is therefore economically of no benefit.

Thus, the present invention achieves a final product having a uniform coating with superior adhesion with the added advantages that the plastic articles can be coated with liquid paints or lacquers, powdered plastics, and liquid coatings containing filamentary reinforcing agents in existing spraying equipment and that recessed surfaces of the articles receive a coating which is approximately as thick as the exterior surfaces. The sulfonated plastic articles can be mixed in with metal parts to be coated if desired or treated and run separately without altering the equipment. Furthermore, composites of plastic and metal can be uniformly coated by this process. Plastic articles can be coated with a different plastic coating to take advantage of the properties of the coating material. Thus, epoxy resin articles can be made nonstickable by this process. After the epoxy resin article is sulfonated it is coated with a powdered polyfluorocarbon resin followed by a sintering step.

Examples of the plastic articles which can be coated by this process are molded toys, furniture, radio and television cabinets, foamed automotive crash pads, foamed plastic protective helmets such as football helmets, race car helmets, motorcycle crash helmets, and foamed plastic construction panels.

DETAILED DESCRIPTION

In general, any sulfonatable, solid or foamed, plastic or resin article can be used as a substrate in this process, the only requirement being that the plastic must have replaceable hydrogen atoms bonded to carbon atoms. Thus, polytetrafluoroethylene cannot be used as a substrate in this process since it does not have any replaceable hydrogen atoms and therefore is not sulfonatable.

Thermosetting plastics which may be used as substrates are epoxy resins, phenol-formaldehyde resins, urea-formaldehyde resins, silicones, polyurethanes, etc.

Thermoplastic resins which may be used as substrates in this process are the addition-type homopolymers, copolymers, and blends thereof prepared from olefins, halogenated olefins, vinyl halides, vinylidene halides, vinyl esters, acrylic esters, methacrylic esters, and styrene. Examples of these resins are the polyolefins such as polyethylene, polypropylene, polymethylpentene and polybutylene; halogenated polyolefins, such as chlorinated polyethylene and chlorinated polypropylene; polyvinyl resins such as polyvinyl chloride, polyvinyl acetate, polyvinylidene chloride, polyethyl arcrylates and polyethyl methacrylates, and polystyrene. Examples of copolymers used herein are vinyl chloridevinyl acetate copolymers, styrene-acrylonitrile copolymers and acrylonitrile-butadiene-styrene copolymers and the like. Examples of the polymer blends are polyethylenepolyethyl acrylates, rubber modified polystyrenes and the like. Thermoplastic condensation type resins are exemplified by polyamides such as nylon, polyesters such as polyethylene-terephthalate, polycarbonates and polyethers such as polyformaldehyde.

The term plastic or resin articles as used in this specification includes the above homopolymers, copolymers and blends made from the above listed plastics as well as flexible foams and rigid foams made therefrom.

The above plastic articles are sulfonated to the required degree by a vapor phase process using dilute gaseous sulfur trioxide, chlorosulfonic acid, or fluorosulfonic acid in an inert gas; by a liquid phase sulfonation process using dilute sulfur trioxide in an inert chlorinated solvent; concentrated sulfuric acid; or oleum. These techniques are well known in the art as is shown by U.S. Pats. 2,945,842 to Eichhorn et al., 2,937,066 to Walles, and 2,854,477 to Steinhauer. In general the vapor phase sulfonation technique is preferred since there is no visible attack of the plastic surface as shown for some aromatic plastics in the method wherein inert solvents are used, and gaseous sulfur trioxide is preferred over the halosulfonic acids because the use of these acids produces hydrochloric acid or hydrofluoric acid as byproducts. Likewise, the vapor phase technique eliminates the need for solvents and solvent recovery; no water washing is needed as with concentrated sulfuric acid.

The plastic articles are contacted with the sulfonating agents for a period of time that varies inversely with the temperature and concentration in order to achieve the desired degree of sulfonation. For example, if one uses an 8% by volume concentration of sulfur trioxide in an inert gas such as carbon dioxide at 25° C. to sulfonate the plastic articles to the extent of 1 milligram of $SO_3$ in the form of sulfonic acid groups per square centimeter of surface, one can use a contact time of about 30 seconds. On the other hand, this concentration can be reduced to 2% sulfur trioxide if desired, with an increase of the contact time to about 3 minutes for the same degree of sulfonation. Other changes in the temperature, etc. can be made by those skilled in the art.

Following sulfonation, the plastic articles containing sulfonic acid groups can be neutralized by contact with gaseous ammonia and dilute solutions of basic materials such as inorganic and organic compounds. Examples of these are aqueous ammonia, aqueous amine solutions, aqueous solutions of alkali metal and alkaline earth metal hydroxides, carbonates, bicarbonates, acetates, etc. This step is not mandatory to the success of the present invention but is desirable in the case where the plastic article has been sulfonated to a relatively high degree such as about 50 milligrams per square centimeter and is to be coated with a latex paint. The neutralization of the sulfonic acid groups will then prevent any tendency of the sulfonic acid groups to chemically degrade the coatings and pigments used therein.

Following sulfonation, or following sulfonation and neutralization, the plastic articles are normally water washed and dried before being spray coated to remove any trace of excess sulfonating or neutralization agents which might interfere with the subsequent coatings.

The equipment used to spray the sulfonated plastic articles is not critical and can be one of the commercially available electrostatic spray systems as illustrated by the following U.S. patents: Stone, 2,952,351; Ransburg, 2,729,191; Simmons, 2,808,343; Ransburg et al., 2,247,963.

As indicated in the foregoing patents the articles to be painted are usually grounded and the coating spray given a positive or negative charge in the range of 90,000–200,000 volts as it leaves the spray head. Alternatively, the coating spray can be sprayed into an electrostatic field adjacent to an emitting electrode wherein the articles constitute the collecting electrode.

The coating materials which are used in this process are not critical and can be one of a number of different types of liquid paints, and lacquers, as well as powdered resins well known to the electrostatic spraying art. Examples of these liquid coatings are alkyl resin paints, spar varnishes, acrylic ester resin coatings, vinyl chloride copolymer resin coatings, chlorinated rubber paints, linseed oil paints and epoxy ester resin coatings. These are diluted with suitable solvents so that the coating liquid has a viscosity of about 20–200 seconds when measured by a number 4 Ford cup.

Examples of the powdered resins useful in this invention are cellulose acetate-butyrate, polychloromethyloxetane, polyfluorocarbon resins, polyamides such as nylon, polyesters, polyethylenes, polypropylene, polyvinylchloride and epoxy resins.

It is usually necessary to subject the sprayed plastic articles to a curing step which consists of drying or heating and drying in the case of liquid coatings and heating in the case of powdered resins to melt the powdered coating. It is, of course, necessary to use a temperature of heating which is below the melting or softening point of the plastic substrates. Air drying paints are thus preferred since little or no heating is required. Where heating is necessary for fusion as in the use of powdered resins, it is preferred that infra red heating or flame treatments be used as these tend to heat and fuse only the surface without softening the plastic substrate. Since a large number of combinations of substrates and coatings are known to the art, detailed considerations of time, temperature and technique of carrying out the finishing steps of the coating process are well known to those having skill in this art.

The following examples are presented solely to illustrate the invention and should not be construed as a limitation on the scope of the claimed invention.

Example 1

Eight molded plaques measuring ⅛ x 4 x 11 inches of a copolymer of styrene and acrylonitrile containing about 72 percent by weight of styrene and 28 percent by weight of acrylonitrile having a melt flow of 4.0 (ASTM D–1238 Condition I) are divided into two groups of four. The first group of four (the test group) is then surface sulfonated to a degree of about 0.0075 milligram of $SO_3$ in the form of sulfonic acid groups per square centimeter in a 2% by volume gaseous mixture of sulfur trioxide in carbon dioxide for a period of two minutes at a temperature of 25° C., neutralized in an atmosphere of pure ammonia gas for one minute at the same temperature, washed in water to remove excess ammonia and dried.

The treated first group and the untreated second group are then placed on a conveyor alongside a series of cleaned and degreased cold rolled steel plates of the same size in an electrostatic paint spraying apparatus of conventional design having a grounded conveyor with hangers for small parts, a spray booth and an electrostatic air spray head capable of giving the sprayed coating particles an electrostatic charge of 90,000 to 200,000 volts. A white acrylic ester coating containing, in parts by weight, 15 parts of titanium dioxide, 75 parts of polymerized octadecyl methacrylate (30% parts by weight in toluene), 2 parts of butyl benzyl phthalate, and 8 parts of toluene is then sprayed on the metal and plastic parts by the spray head operating with a negative potential of 125,000 volts.

The coated articles are then dried in an oven at 175° F. for ten minutes and examined. It is found that the metal parts and the surface sulfonated plastic plaques accepted the resin coating very uniformly. The untreated control plaques have very little coating on them. In addition it is noted that the adhesion of the coating to the sulfonated plaques is superior to the coated metal parts when tested by the "Scotch tape" test. This test involves cutting a series of cross-hatched slits in the coating with a razor blade one-sixteenth of an inch apart. One then applies a piece of pressure sensitive plastic tape to this cross-hatched area and pulls it off again.

When this test is applied to the foregoing panels, it is observed that none of the coating comes off on the adhesive tape when it is applied to the sulfonated plaques, some of the coating comes off the metal plaques and all of the coating comes off the unsulfonated plastic plaques.

Example 2

Five molded flower pots of foamed polystyrene having an exterior indented surface design and a truncated conical shape with a maximum diameter of five inches and a height of five inches are sulfonated and neutralized as in Example 1.

These are placed open side up on a conveyor feeding into a conventional electrostatic paint sprayer similar to that used in Example 1. A control group of five untreated flower pots is added to the conveyor and the whole series is spray painted with a red acrylic ester coating containing 12 parts of red lead pigment, 78 parts of polymerized octadecyl methacrylate, 2 parts of butyl benzyl phthalate and 8 parts of toluene.

The coated articles are then air dried for four hours at room temperature.

When the aforementioned "Scotch tape" test is applied to both the treated and untreated samples, it is found that all or most of the paint comes off the controls whereas little or no paint comes off the pretreated flower pots. In addition, it is found that the recesses of the surface design and the interior of the treated flower pots are giving a coating equal in all respects to the exterior surfaces which contrasts sharply from the non-uniformly painted controls.

We claim:

1. In a process of electrostatically coating a plastic article including the steps comprising (a) treating the surface of said article to render its surface electrostatically coatable, and (b) electrostatically coating said article; said treating step being a step which does not interfere with the normal degree of adhesion between the untreated surface of said article and the electrostatically applied coating; said treating step comprising surface sulfonating said article.

2. A process according to claim 1 wherein the plastic article is contacted with a neutralization agent after sulfonation and before being electrostatically coated.

3. A process for the spray coating of a plastic article according to claim 1 which comprises the steps of (a) sulfonating the surfaces of the plastic article, (b) passing the sulfonated plastic article on an electrically conductive support into a zone of high electrostatic potential having a collecting electrode and an emitting electrode wherein the support is connected to one of said electrodes, and (c) electrostatically spraying the sulfonated article with a spray coating until it acquires the desired coating thickness.

4. The process according to claim 3 which includes the additional step of contacting the sulfonated article with a neutralizing agent immediately after the sulfonation step.

5. The process according to claim 3 which includes the final step of curing the coated article.

6. The process according to claim 3 which includes the additional steps of (a) contacting the sulfonated article with a neutralizing agent immediately after sulfonation, and (b) curing the coated article as a last step.

7. The process according to claim 1 wherein the plastic article is sulfonated until it has at least 0.001 milligram of $SO_3$ in the form of sulfonic acid groups per square centimeter of surface.

8. The process according to claim 7 which includes an additional step of contacting the sulfonated article with a neutralizing agent immediately after the sulfonation step.

9. The process according to claim 7 which includes the final step of curing the coated article.

10. The process according to claim 7 which includes the additional steps of (a) contacting the sulfonated article with a neutralizing agent immediately after sulfonation and (b) curing the coated articles as the last step.

11. The process according to claim 1 in which the plastic article is solid.

12. The process according to claim 1 in which the plastic article is foamed.

References Cited

UNITED STATES PATENTS

| | | | |
|---|---|---|---|
| 2,832,698 | 4/1958 | Walles | 117—47X |
| 2,937,066 | 5/1960 | Walles | 8—4 |
| 3,236,679 | 2/1966 | Spiller et al. | 117—93.4(NC) |

FOREIGN PATENTS

| | | | |
|---|---|---|---|
| 663,885 | 12/1951 | Great Britain | 117—93.4NC |

ALFRED L. LEAVITT, Primary Examiner

J. H. NEWSOME, Assistant Examiner

U.S. Cl. X.R.

117—93.4, 138.8